Patented May 26, 1925.

1,539,701

UNITED STATES PATENT OFFICE.

EGBERT CORNELIS SUTHERLAND, OF DEVENTER, NETHERLANDS, ASSIGNOR TO THE FIRM NAAMLOOZE VENNOOTSCHAP INDUSTRIEELE MAATSCHAPPIJ VOORHEEN NOURY & VAN DER LANDE, OF DEVENTER, NETHERLANDS.

PROCESS OF BLEACHING, PRESERVING, AND INCREASING THE BAKING QUALITIES OF FLOUR AND OF OTHER MILLING PRODUCTS.

No Drawing. Application filed November 24, 1920. Serial No. 426,223.

*To all whom it may concern:*

Be it known that I, EGBERT CORNELIS SUTHERLAND, a citizen of the Netherlands, residing at Deventer, Netherlands, have invented certain new and useful Improvements in Processes of Bleaching, Preserving, and Increasing the Baking Qualities of Flour and of Other Milling Products, of which the following is a specification.

My invention relates to a process for treating meal or flour and milling products of all kinds and has for its object to improve the color; the baking qualities and the durability of these products.

By the term "improvement in the baking qualities", the property is meant that dough prepared from meal treated in this way swells stronger than dough from untreated meal and produces loaves which are proportionally larger, from the same amount of flour or meal.

The process may be applied to all kinds of meal or flour and milling products obtained from grain, as well as to all intermediate products. It may also be applied to meal from beans and tubers, which latter application has the important advantage that not only the color and the durability of such meals are improved, but that also the disagreeable odor and flavor, often adhering to such meals, fully disappear. This is, for instance, the case with meal from soya beans and from manioc roots.

The most important properties for judging the quality of floor from grain are its baking quality, its color and its keeping quality.

Many efforts have been made to improve the baking qualities of meal and flour, however, without entirely satisfactory results. Of the methods proposed for improving the color of flour and milling products from grain, those in which dioxid of nitrogen is used, have proved to be practicable to a certain degree. With the nitrogen dioxid treatment however it very soon became apparent that the improvement in the color resulting therefrom was of little importance, while the control of the process was very difficult, inasmuch as one had always to guard against a too vigorous action of the nitrogen dioxide which would result in imparting a brown color to the flour. Besides it was supposed, (rightly or wrongly), that the nitrogen oxid caused the formation of poisonous or deleterious compounds in the flour and that its digestibility was decreased.

That is why in some places the processes in which nitrogen dioxid is used have fallen into disuse, and as matters stand at present the milling trade does not yet possess a wholly practical and entirely satisfactory process for improving the quality of meal and flour as to its baking qualities, color and durability. It has also been suggested to bleach flour by the aid of ozone or by means of molecular oxygen obtained by the decomposition of water or of other liquids by electrolysis. It has, however, been ascertained in practical working that ozone or ordinary oxygen fail to have a sufficient bleaching action upon flour (see Neumann, "Brotgetreide- und Brot", Berlin 1914, page 307.

In other arts peroxids have been suggested as bleaching agents, for instance hydrogen peroxide.

However, by adding hydrogen peroxide or any other inorganic peroxide in such quantities as can be used without injury to the physical properties of flour in certain cases, it has been found that no change of color (or only an insufficient bleaching) is obtained. This is perhaps due to the action of enzyms in those kinds of flour upon the peroxides.

If the peroxide be activated by the aid of ultra-violet light, for instance, better results are obtained, but even then, the action of the enzym in many cases prevents a wholly satisfactory bleaching action.

Now, I have found that, even with inferior grades of flour, considerable improvements in the color, the keeping quality, and the baking quality may be obtained by mixing the flour with an extremely small quantity of an organic peroxid or of a similar peroxidized product, and by then subjecting such organic peroxide to a chemical or physical influence, thus for instance by subjecting it to the action of light rich in chemically active rays, or by the action of heat. The flour thereby assumes a fresh and intensely white color.

Besides the above mentioned results there is obtained another important technical effect, to wit—the increasing of the moisture-absorbing qualities of the flour, meal, or milling products. Therefore, the bread yield from the same amount of a particular kind of flour is increased by treatment of the flour according to this invention.

Organic peroxidation products which give excellent results in this connection are the following:—

(a) The organic peroxides of the type of benzoyl-peroxid or of acety-benzoyl-peroxide.

(b) The organic per-acids, such as per-acetic acid or per-benzoic acid.

(c) The salts of the per-acids mentioned under (b).

The peroxid compounds hereinabove referred to can be considered as being derived from (or chemically related to) hydrogen peroxid, and are to be clearly distinguished from those substances which are capable of acting as oxidizing agents but which would not produce any bleaching effect, such as chlorates, perchlorates, persulfates and the like. These latter substances, if employed in the manner herein described would not produce all the effects herein described.

These organic peroxid compounds, (when alone i. e., when unmixed with flour or like materials) behave quite differently from some of the inorganic peroxids, notably hydrogen peroxid. They can, furthermore, when mixed with flour or other like milling products, be activated much more readily than the inorganic peroxids. Benzoyl-peroxide for instance is (when alone, that is to say, in the pure state) quite stable against the action of light. By mixing however, some benzoyl-peroxide with flour, a very weak and short exposure to actinic light is sufficient, in order to activate the peroxide in the flour, and to produce the bleaching of the flour. If benzoyl-peroxide alone is heated to about 80° C., or even to a higher temperature, it takes several hours for the peroxide to completely part with its available oxygen.

If flour is mixed with benzoyl-peroxide, the flour is bleached unexpectedly and immediately at a temperature of about 60 to 65° C. Very small quantities of the organic per-compounds are capable of bleaching large amounts of flour, also the sterilizing action and the improvement of the baking quality of the flour is very marked. Moreover it has been observed that the decomposition of the organic peroxidized compound by physical means may be carried out simply by mixing the flour, meal, or milling product with the organic peroxidized compound, this mixing only, producing the above mentioned results, in a sufficient degree.

As already mentioned, the flour is very thoroughly sterilized by this process, and acquires a practically unlimited keeping quality. On being stored, it does not acquire a mouldy odor or taste before real putrefaction sets in, as is the case frequently with untreated flour. Such mouldiness in untreated flour is caused by the action of moulds and of bacteria.

The improvement of the baking qualities is certainly partly to be ascribed to the fact, that living micro-organisms, having an unfavorable influence on the fermentation, are no longer present in the treated meal or flour. On the other hand the stiffness and elasticity of the gluten are increased.

The process may for instance be carried out as follows: Mixed and sifted flour, such as is for instance obtained from a mixture of Plata, Kansas and Montana wheat is mixed with 0.02% by weight of acetyl-benzoyl-peroxide. Then, the flour is transported upon conveyor belts or aprons through a room containing mercury-vapor lamps operated with a voltage of about 220 volts. The thickness of the layer of flour upon the transporting belts may amount to about 3 c. m., and the speed of travel is regulated in such a manner that for each lamp about 400 kilograms of flour pass through the room per hour.

In the case of some flours it is advantageous to effect the decomposition of the peroxide by heat, and if required, with simultaneous subjection to actinic light.

One may for instance mix flour from hard wheat with about 0.025% by weight of benzoyl-peroxide, and heat the flour to about 65° C., at which temperature the bleaching takes place spontaneously. With simultaneous subjection to actinic light one may proceed even at a lower temperature. Even without heating, and without subjecting to actinic light, the bleaching is effected to some extent, when the mixture is simply allowed to stand, as for instance in storage. Time and temperature will thus be seen to be supplementary to each other, in producing the reaction.

In place of one single per-compound, one may, of course, use a mixture of different compounds, the per-compounds being added either as such, dry to the flour, or they may be added in solution or in suspension in liquids such as e. g. water or highly diluted lactic acid. Lactic acid, highly diluted in water, is a good liquid for the purpose as it is without action on the peroxides when cold, and the minute amount present can readily be absorbed by the flour, or other milling products, without any injury to the latter. The amount of per-compounds required may be altered in accordance with the condition and the quality of the flour to be treated. As a general rule, a small amount such as a few hundredths of one per cent is quite sufficient. The process may be applied to all kinds of grain flour and grain mill products; also to all intermediate products. One may also employ the process in connection with bean flour or potato flour or flour produced from other tubers, and thereby the great advantage is obtained of not only improving the keeping qualities and the color of these flours, but at the same time the unpleasant odor and taste often inherent in such flours is entirely removed. This is the case for instance with soja-bean and manioc-root flours.

Temperatures around 65° C., or slightly below, are found to give good results with the various peroxid compounds enumerated in the specification, and others which I have used.

The present application is in part a continuation of my co-pending U. S. patent application filed December 19, 1916, Serial No. 136,551 (now Patent 1,380,334, May 31, 1921), in which I have described the treatment of flour with peroxid compounds followed by subjection to a chemical or physical treatment capable (in the case for instance of $H_2O_2$) of producing the liberation of nascent oxygen therefrom, to act upon the said flour. Such prior case refers to the use of organic or inorganic peroxides (of course excluding nitrogen oxide) and subsequently causing the production of nascent oxygen to bleach and improve the flour, for example by exposing the mass to the action of the light from mercury-vapor lamps.

No claim is made herein to the use of persulfates of metals, which substances act in a substantially different manner from the peroxids, and particularly the organic peroxids as referred to in the present case.

I claim:

1. A process for treating flour, meal or other cereal or analogous milling product, consisting in mixing the product with a reagent containing as its essential constituent, an organic peroxidized compound and thereafter carrying out a reaction of this compound upon said product, while mixed therewith and while maintaining the said product in a substantially dry and pulverulent condition.

2. A process for treating flour or other cereal or analogous milling product, consisting in mixing the product with a dry organic peroxide and thereafter accomplishing a reaction of this peroxide upon said product while mixed with said product.

3. The treatment of edible milling products while in a finely-divided state, with ultra-violet rays while in the presence of an organic oxidizing agent.

4. The process of treating edible milling products of the nature set forth, and similar material, which comprises bleaching the same by treatment with an organic oxidizing agent in conjunction with the step of subjecting the same while in a pulverulent state to the action of a reaction-accelerating influence.

5. A process for treating flour, meal or other cereal or analogous milling product, consisting in mixing the product with a benzoyl peroxide compound and thereafter effecting a reaction of this compound on the said product while in the mixture, and while maintaining the said product in a substantially dry and pulverulent condition.

6. A process for treating flour, meal, or other cereal or analogous product, consisting in mixing the product with a dry benzoyl peroxide compound and thereafter heating the mixture to accelerate the reaction.

7. A process for treating flour, meal or other cereal or analogous milling product consisting in mixing the product with an organic peroxide compound, thereafter spreading out the mixture in the form of a layer upon a belt-conveyor and moving the belt-conveyor with the mixture thereon through a room in which the mixture is exposed to actinic rays.

8. A process for treating flour, meal or other cereal or analogous milling product, consisting in mixing the product with not more than a few hundredths of a per cent of an organic peroxide and thereafter subjecting this peroxide to an activation while maintaining substantially the normal consistency of the said product.

9. An intimate mixture comprising an edible cereal milling product in substantially its normal pulverulent substantially dry condition, incorporated with a small quantity of an organic peroxide compound.

10. An intimate mixture comprising a pulverulent cereal milling product in its normal substantially dry condition, incorporated with an exceedingly small percentage of a true peroxide as such, such peroxid having the property of bleaching the said milling product.

11. An intimate mixture comprising an edible cereal milling product incorporated with a small quantity of a benzoyl peroxide compound.

12. An intimate mixture comprising a milling product intimately incorporated with a small amount of benzoyl peroxide.

13. An intimate mixture comprising an edible cereal milling product, incorporated with a small quantity of an organic peroxid compound.

14. As a new material of manufacture, an edible milling product carrying admixed therewith, a proportion of a "true" organic peroxid corresponding to not substantially more thereof than is necessary to bleach said product and to improve its baking qualities.

15. A process of treating an edible milling product, which comprises mixing the said milling product with an organic peroxid compound in a solid state, said peroxide compound having the property of producing a bleaching action on said milling product, and having the property of increasing the yield of bread.

16. A process for treating flour, meal or any other edible milling product, consisting in mixing the product with an organic peroxid and thereafter causing such materials to react with each other.

17. In the treatment of an edible milling product, the step of intimately incorporating such product with an organic peroxid compound for improving said product.

18. A process for treating flour, meal or any other milling product, which comprises mixing the product with an aromatic organic peroxidized compound.

19. The process of treating edible milling products of the nature set forth, and similar materials, which comprises bleaching the same by treatment with a powerful organic oxidizing agent in conjunction with the step of subjecting the same to the action of a reaction-accelerating influence.

20. A process for treating flour, meal or any other edible milling product, consisting in mixing the product with a benzoyl peroxid compound and thereafter rendering this compound more reactive when in the mixture.

21. A process for treating flour, meal, or any other edible milling product, consisting in mixing the product with a benzoyl peroxid compound and thereafter accelerating the reaction of this peroxid compound, when in the mixture at not substantially over 65° C.

22. A process for treating flour, meal or other milling product, consisting in mixing the product with not more than a few hundredths of a per cent of an organic peroxid, and thereafter rendering this peroxid more active.

23. In the treatment of flour, meal and like milling products, the step of subjecting an organic peroxid to reaction with an edible milling product, the amount of such peroxid being sufficient to improve the baking qualities of such milling product, and to bleach it.

24. A process which comprises the step of treating flour, meal and like edible milling products with a percentage of benzoyl peroxid not substantially greater than 0.02%.

25. The step in the process of making bread which consists in incorporating with the flour which is to be used in a dough batch, an organic peroxid in such quantities as will increase the moisture capacity of the flour above the normal without breaking down the gluten in the flour, such peroxid being non-toxic to permit its use in a food product.

26. The step in the process of making bread, which consists in incorporating with the flour, an organic peroxid in such quantities as will increase the moisture capacity of the dough batch above the normal, without breaking down the gluten in the flour, such peroxid being non-toxic to permit its use in a food product, and adding the other ingredients of a dough batch.

27. The step in the process of making bread which consists in incorporating with the flour which is to be used in a dough batch, benzoyl peroxid in such quantities as will increase the moisture capacity of the flour above the normal without breaking down the gluten of the flour.

28. The step in the process of making bread which consists in incorporating with the flour, benzoyl peroxid in such quantities as will increase the moisture capacity of the dough batch above the normal without breaking down the gluten of the flour, and adding the other ingredients of a dough batch.

29. The process of making bread which comprises incorporating with the flour to be used in the dough batch, an organic peroxid of the class including those peroxids which are derived from hydrogen peroxid, in amount corresponding to not more than a few hundredths of a per cent of hydrogen peroxid, whereby the amount of bread which can be produced from a given quantity of the flour is increased.

30. The step in the process of making bread, which consists in incorporating with the milling product to be used in the bread, an organic peroxid in such an amount as will improve the baking qualities of said milling product, but not greatly in excess of the quantity necessary to bleach said milling product, such peroxid being non-toxic to permit its use in making a good product.

31. The step in the process of making bread, which consists in incorporating with the flour, an organic peroxid in such an amount as will increase the moisture capacity above the normal, the amount of such peroxid being not substantially greater than the equivalent of 0.02% $H_2O_2$ relative to the weight of the said flour, such peroxid being non-toxic to permit its use in a food product, and adding the other ingredients of a dough batch.

32. A process of treating edible milling products which comprises carrying out a reaction of an organic peroxidized compound upon said product.

In testimony whereof I affix my signature.

EGBERT CORNELIS SUTHERLAND.